(12) United States Patent
Li et al.

(10) Patent No.: US 8,614,887 B2
(45) Date of Patent: Dec. 24, 2013

(54) PORTABLE ELECTRONIC DEVICE AND SUPPORT MECHANISM THEREOF

(75) Inventors: Wu-Guo Li, Shenzhen (CN); Bing-Jing Xu, Shenzhen (CN); Chun-Che Yen, New Taipei (TW); Yang-Gen Liu, Shenzhen (CN); Yu-Tao Chen, New Taipei (TW); Te-Sheng Jan, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 264 days.

(21) Appl. No.: 13/298,301

(22) Filed: Nov. 17, 2011

(65) Prior Publication Data

US 2012/0170189 A1    Jul. 5, 2012

(30) Foreign Application Priority Data

Dec. 30, 2010 (CN) .......................... 2010 1 0616247

(51) Int. Cl.
| | |
|---|---|
| *G06F 1/16* | (2006.01) |
| *H05K 5/00* | (2006.01) |
| *H05K 7/00* | (2006.01) |
| *H05K 7/16* | (2006.01) |
| *H05K 1/14* | (2006.01) |
| *A47G 29/00* | (2006.01) |
| *F16M 11/00* | (2006.01) |
| *A47B 97/04* | (2006.01) |

(52) U.S. Cl.
USPC ................. 361/679.59; 361/679.01; 361/725; 361/727; 361/741; 248/688; 248/463

(58) Field of Classification Search
USPC ............ 361/679.01, 679.02, 679.03, 679.31, 361/679.41, 679.44, 679.59, 724, 725, 726, 361/727, 732, 741; 248/688, 691, 463
See application file for complete search history.

(56) References Cited

U.S. PATENT DOCUMENTS 7,011,285 B2 * 3/2006 Wang et al. ................... 248/673
8,047,499 B2 * 11/2011 Yu et al. ........................ 248/688

FOREIGN PATENT DOCUMENTS

| CN | 201039610 Y | 3/2008 |
| TW | 201020443 A | 6/2010 |

* cited by examiner

*Primary Examiner* — Hoa C Nguyen
*Assistant Examiner* — Binh Tran
(74) *Attorney, Agent, or Firm* — Altis Law Group, Inc.

(57) ABSTRACT

An exemplary portable electronic device includes a housing defining an opening, an internal fixing element including a pair of protruding blocks and defining a groove in communication with the opening, and a support mechanism. The groove defines a stepped structure and includes a larger groove portion, and a smaller groove portion communicating with the larger groove portion. The support mechanism is slidably receivable in the housing, and includes a support and a slider defining a recess. The slider includes a connection portion received in the recess and a head set atop the connection portion. The connection portion abuts the pair of the protruding blocks when the slider is in a retracted position. The head is received in the larger groove portion and slidably resting on a step formed between the larger and smaller groove portions. The support includes a body and a board connected to one end of the body.

17 Claims, 10 Drawing Sheets

PORTABLE ELECTRONIC DEVICE AND SUPPORT MECHANISM THEREOF

BACKGROUND

1. Technical Field

The present disclosure relates to portable electronic devices and support mechanisms of portable electronic devices.

2. Description of Related Art

Portable electronic devices such as tablet computers and electronic readers can typically benefit from employing a support, so that the portable electronic device can stand approximately upright on a surface such as a desktop or tabletop. However, a proper support may not be found for the portable electronic device when, for example, the user takes the portable electronic device outdoors.

Therefore, what is needed is a portable electronic device and a support mechanism alleviating the limitations described above.

BRIEF DESCRIPTION OF THE DRAWINGS

The components in the drawings are not necessarily drawn to scale, the emphasis instead being placed upon clearly illustrating the principles of the present portable electronic device and support mechanism thereof. Moreover, in the drawings, like reference numerals designate corresponding parts throughout the several views.

DETAILED DESCRIPTION

Figure 1:
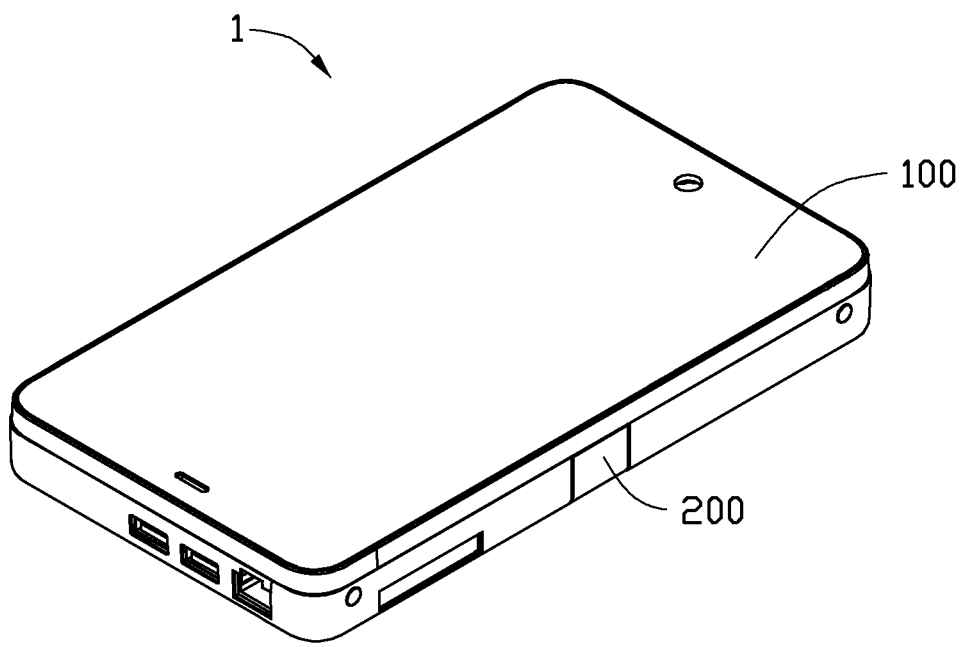
FIG. 1 is an isometric view of an exemplary embodiment of a portable electronic device with a support mechanism, wherein a support of the support mechanism is in a retracted position.

Referring to FIG. 1, an exemplary embodiment of a portable electronic device 1 is shown. The portable electronic device 1 includes a housing 100, and a support mechanism 200 slidably receivable in the housing 100. In the embodiment, the portable electronic device 1 is a tablet computer. In an alternative embodiment, the portable electronic device 1 can be another kind of portable electronic device such as an electronic reader, a mobile phone, or a music player.

Figure 2:
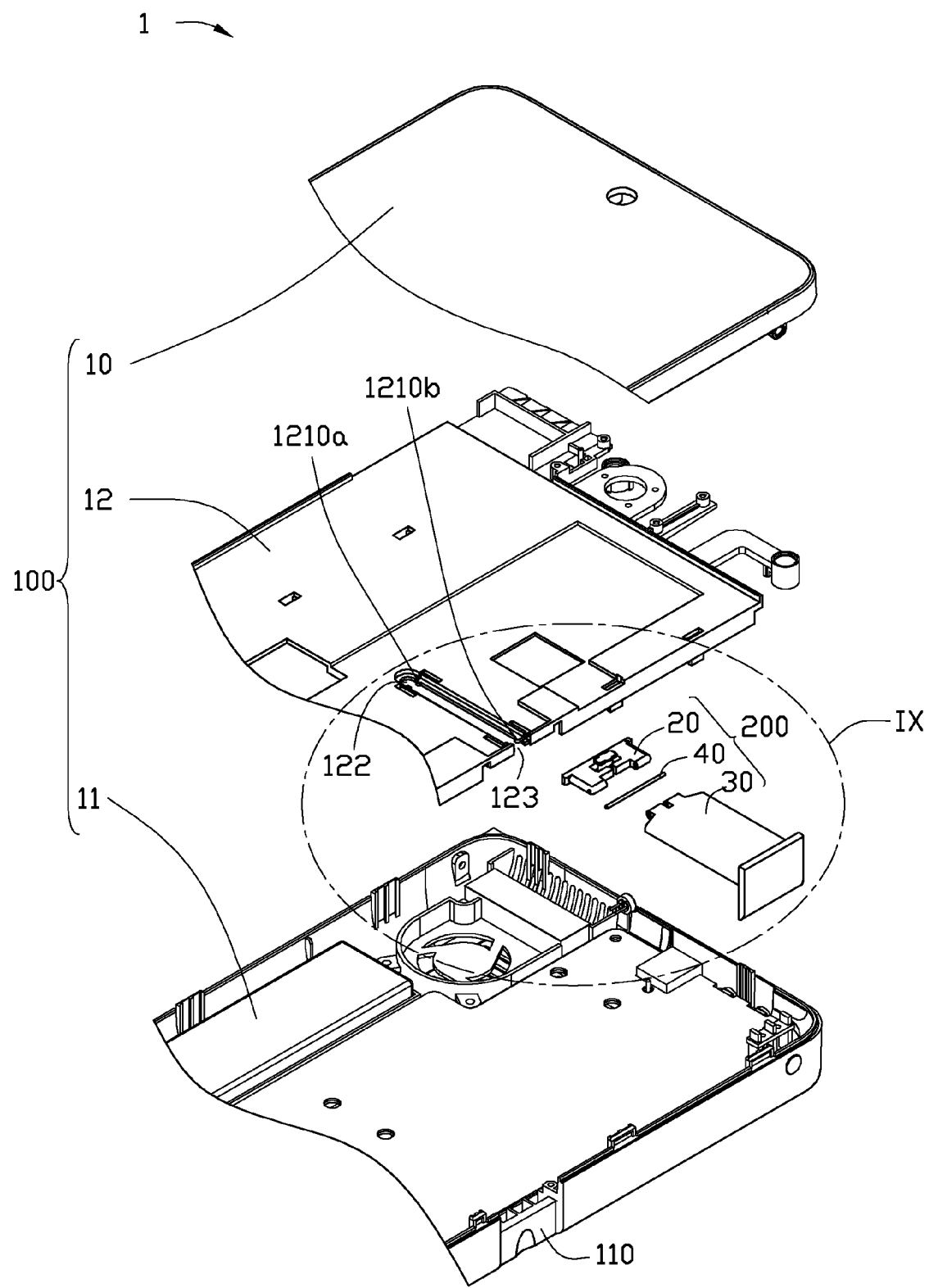
FIG. 2 is an exploded view of a part of the portable electronic device of FIG. 1, viewed from a front of the portable electronic device and showing a fixing element thereof.
Figure 3:
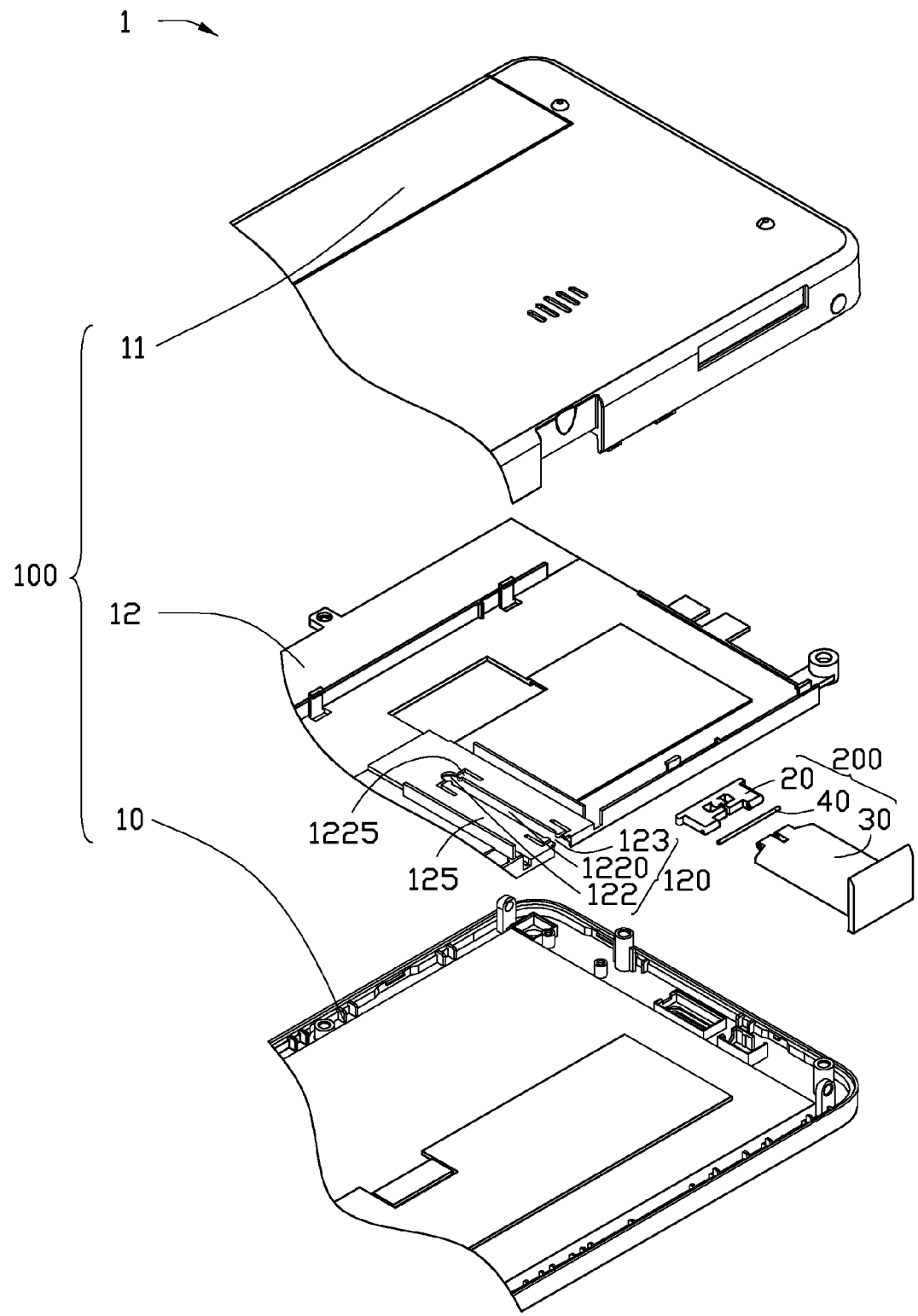
FIG. 3 is an exploded view of a different part of the portable electronic device of FIG. 1, viewed from a rear of the portable electronic device.

Referring also to FIGS. 2 and 3, the housing 100 includes a front cover 10, a back cover 11 corresponding to the front cover 10, and a fixing element 12 fixed to the back cover 11. The back cover 11 defines an opening 110 in a bottom sidewall thereof. In the present embodiment, the fixing element 12 is generally in the form of a board.

The fixing element 12 defines a sliding groove 120 aligned with the opening 110. The sliding groove 120 includes a closed end 122, and an open end 123. The sliding groove 120 defines a stepped structure, wherein the groove 120 includes an elongated, front, larger (i.e. wider) groove portion 1230 and an elongated, rear, smaller (i.e. narrower) groove portion 1220. The larger groove portion 1230 and the smaller groove portion 1220 are in communication with each other. The stepped structure has a substantially arch-shaped configuration, and a step 121 (shown in FIG. 6) is formed between the larger groove portion 1230 and smaller groove portion 1220.

Two L-shaped through slots 1221 are respectively defined in the fixing element 12, adjacent to the closed end 122 at opposite sides of the sliding groove 120.

In the embodiment, the closed end 122 is semicircular. Two L-shaped through slots 1231 are respectively defined in the fixing element 12, adjacent to the open end 123 at opposite sides of the sliding groove 120. The through slots 1221 and 1231 communicate with the sliding groove 120. Thus, a pair of elastically deformable fingers 1225 is formed in the fixing element 12 at the closed end 122, and another pair of elastically deformable fingers 1225 is formed in the fixing element 12 at the open end 123, as seen in FIG. 3. A pair of protruding blocks 1210a protrudes inwardly toward each other from free ends of the fingers 1225 at the closed end 122, and a pair of protruding blocks 1210b protrude inwardly toward each other from free ends of the fingers 1225 at the open end 123. The two pairs of protruding blocks 1210a, 1210b are configured for clasping the support mechanism 200.

Figure 9:
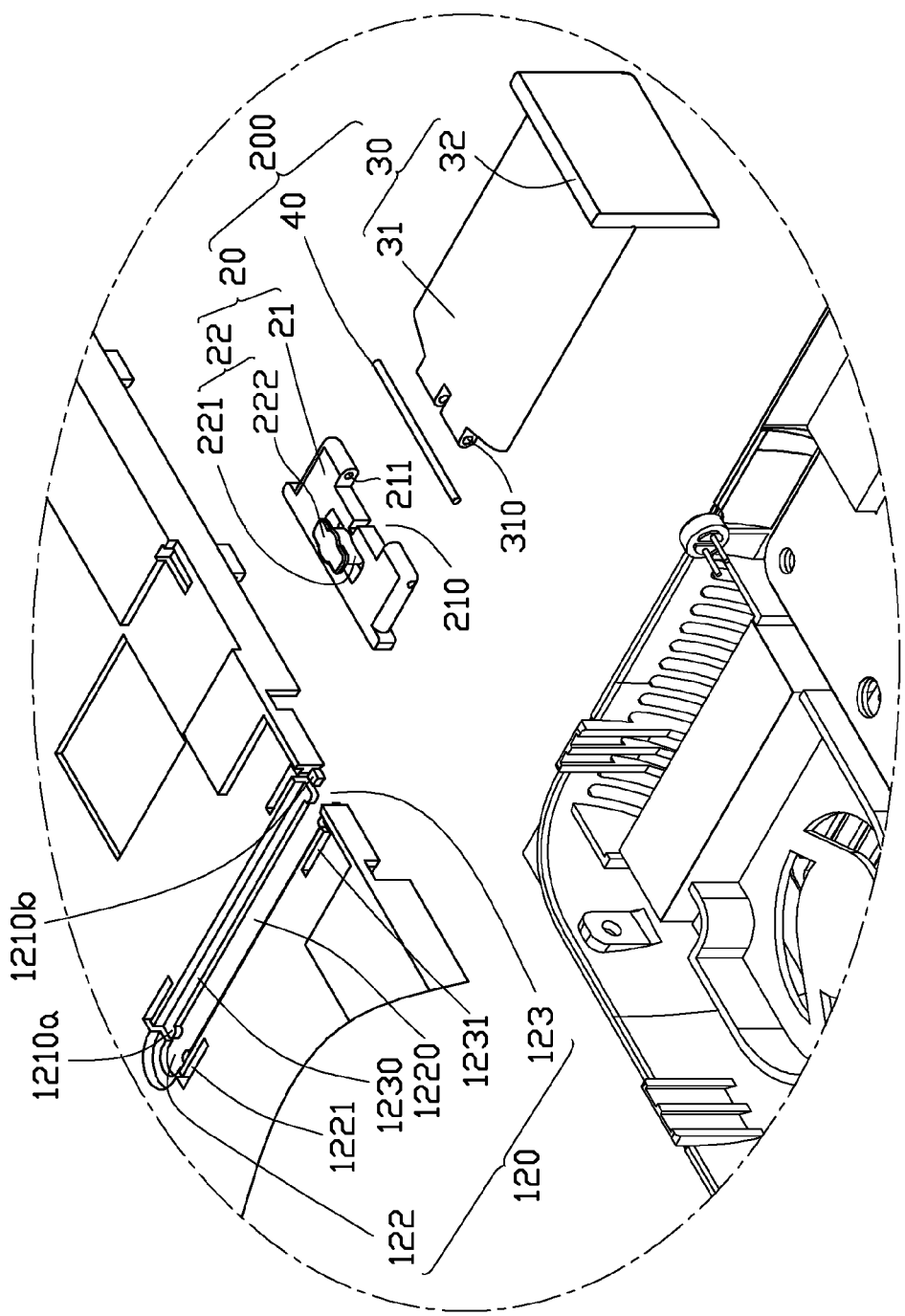
FIG. 9 is an enlarged view of a part marked IX of the portable electronic device of FIG. 2.
Figure 10:
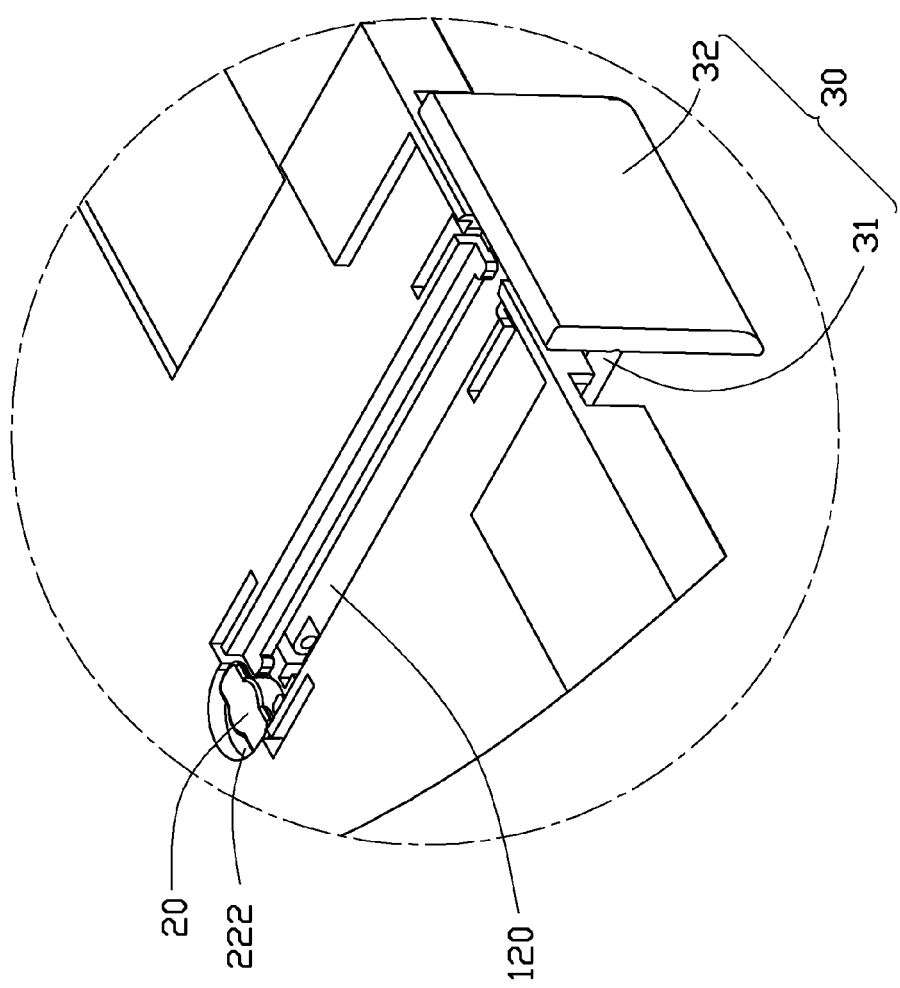
FIG. 10 is an enlarged view of a part marked X of the portable electronic device of FIG. 4.

Referring also to FIGS. 9 and 10, the support mechanism 200 includes a slider 20 received in the sliding groove 120, a support 30 rotatably connected to the slider 20, and a pivot 40. The slider 20 includes a base 21, and a connection member 22 protruding from the base 21. The connection member 22 includes a narrowed connection portion 221, and an enlarged head 222 set atop the connection portion 221. The head 222 is slidably received in the larger groove portion 1230 of the sliding groove 120, and slidably rests on the step 121 formed between the larger groove portion 1230 and smaller groove portion 1220. In the embodiment, the connection portion 221 has a width greater than a gap between the two protruding blocks 1210a and greater than a gap between the two protruding blocks 1210b, and is a cylinder. In particular, the diameter of the connection portion 221 is a little larger than the gap between the protruding blocks 1210a, and a little larger than the gap between the protruding blocks 1210b. The connection portion 221 is slidably received in the smaller groove portion 1220 of the sliding groove 120. The base 21 defines a recess 210 in a bottom end thereof, and two fixing holes 211 in two opposite sidewalls of the recess 210, respectively.

The support 30 includes a body 31 being slidable along a channel 125 defined at the back of the fixing element 12, and a board 32 vertically connected to one end of the body 31. The other end of the body 31 defines a pivot hole 310, and is received in the recess 210 of the base 21. The pivot 40 passes through the pivot hole 310 and the fixing holes 211 of the slider 20, and thus rotatably connects the support 30 to the slider 20.

During assembly of the portable electronic device 1, the support mechanism 200 is first assembled and then is connected to the fixing element 12. Next, the fixing element 12 is fixed to the back cover 11. Finally, the back cover 11 and the front cover 10 are attached together. In detail, in the embodiment, firstly, the pivot 40 is inserted into the pivot hole 310, and two ends of the pivot 40 are respectively received in the two fixing holes 211. Thus, the support 30 is rotatably connected to the slider 20. Secondly, the connection portion 221 is orientated to align with the sliding groove 120, and pushed toward the open end 123. The connection portion 221 first contacts the protruding blocks 1210b at the open end 123. Further pushing of the connection portion 221 causes the corresponding fingers 1225 to deflect outwardly, enlarging the gap between the protruding blocks 1210b. The connection portion 221 can then move into the smaller groove portion 1220 of the sliding groove 120, and the head 222 is received in the larger groove portion 1230 and rests on the step 121 formed between the larger and smaller groove portions 1230, 1220. After the connection portion 221 moves into the smaller groove portion 1220, the protruding blocks 1210b rebound and can prevent the connection portion 221 from accidentally disengaging from the smaller groove portion 1220. Thus the support mechanism 200 is connected to the fixing element 12. Finally, the fixing element 12 is fixed to the back cover 11, and the front cover 10 is coupled with the back cover 11.

Figure 4:
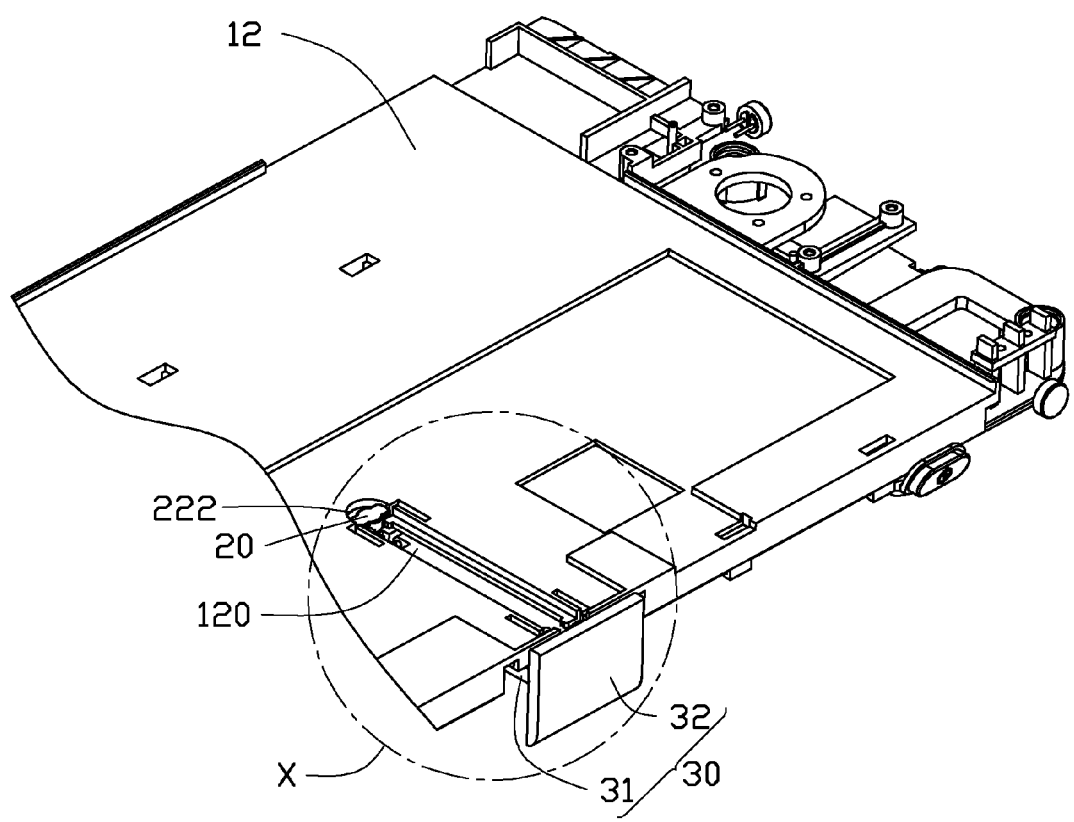
FIG. 4 is essentially an assembled view of the fixing element and the support mechanism of the portable electronic device shown in FIG. 2.
Figure 5:
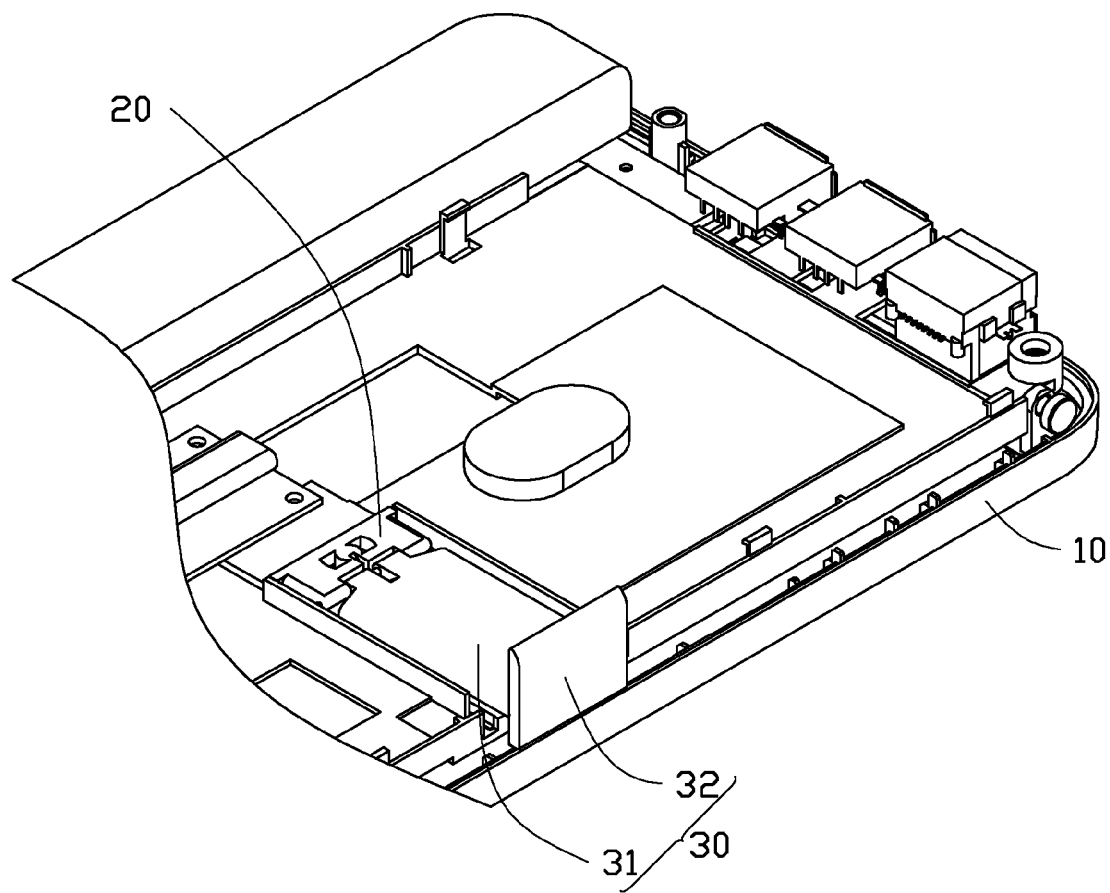
FIG. 5 is essentially an assembled view of the portable electronic device shown in FIG. 3, but omitting a back cover thereof.

Referring to FIGS. 1, 4 and 5, when not in use, the support mechanism 200 is fully received in the electronic device 1, with the board 32 received in the opening 110 and flush with the bottom sidewall of the back cover 11. That is, the support mechanism 200 is in a retracted position. The connection portion 221 is located at the closed end 122 and is restricted from moving outward by the two protruding blocks 1210a. That is, the protruding blocks 1210a prevent the support mechanism 200 from accidentally moving out from the retracted position.

Figure 6:
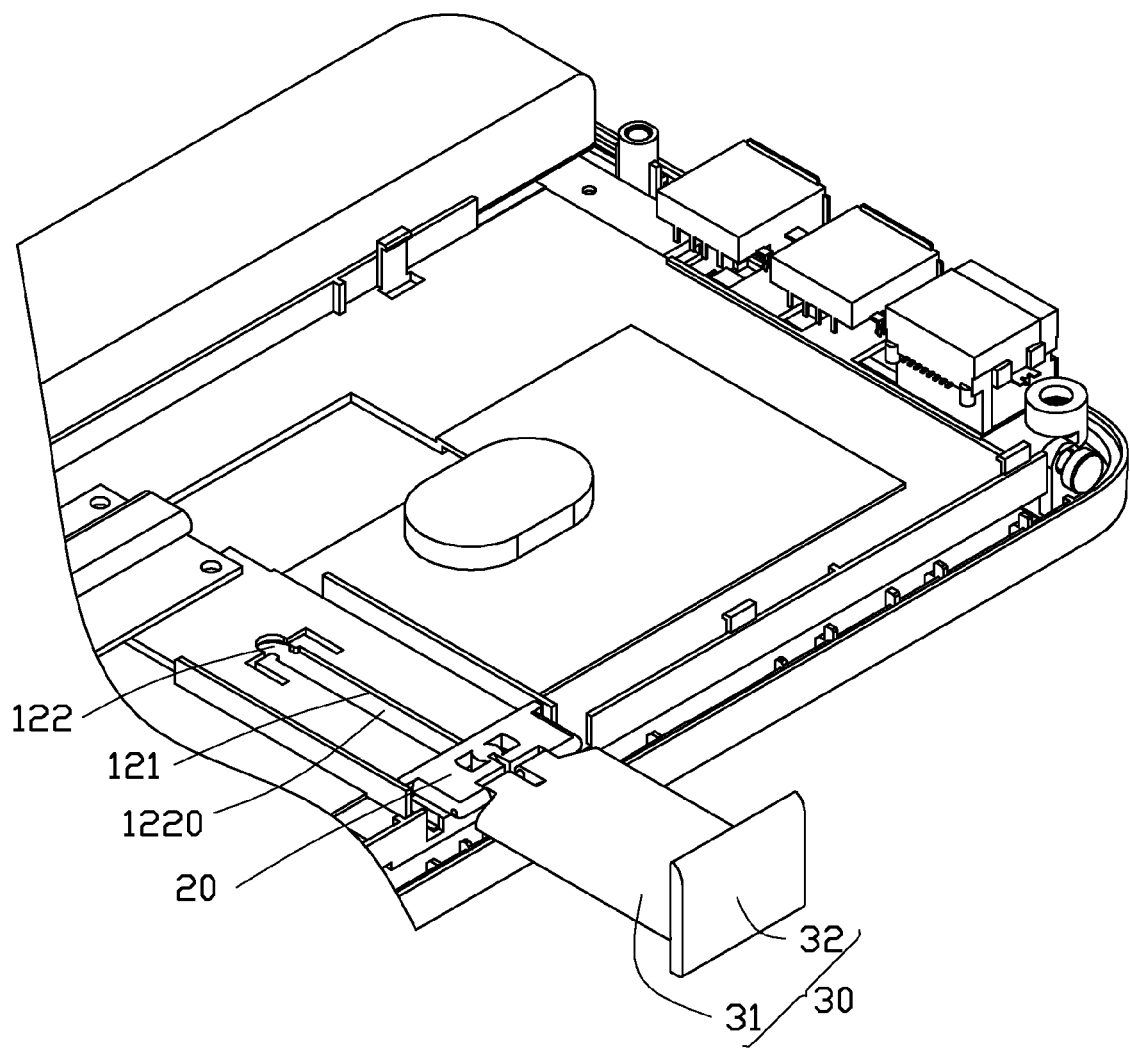
FIG. 6 is similar to FIG. 5, but showing the support in an extended position.

Referring to FIGS. 2 and 6, in use of the support mechanism 200, the board 32 of the support 30 is pulled to cause the connection portion 221 to urge the two protruding blocks 1210a to deflect. Thus, the connection portion 221 can slide along the sliding groove 120. When the connection portion 221 contacts and is blocked by the two protruding blocks 1210b at the open end 123, the support 30 is totally pulled out from the housing 10. That is, the support 30 is in an extended position.

Figure 7:
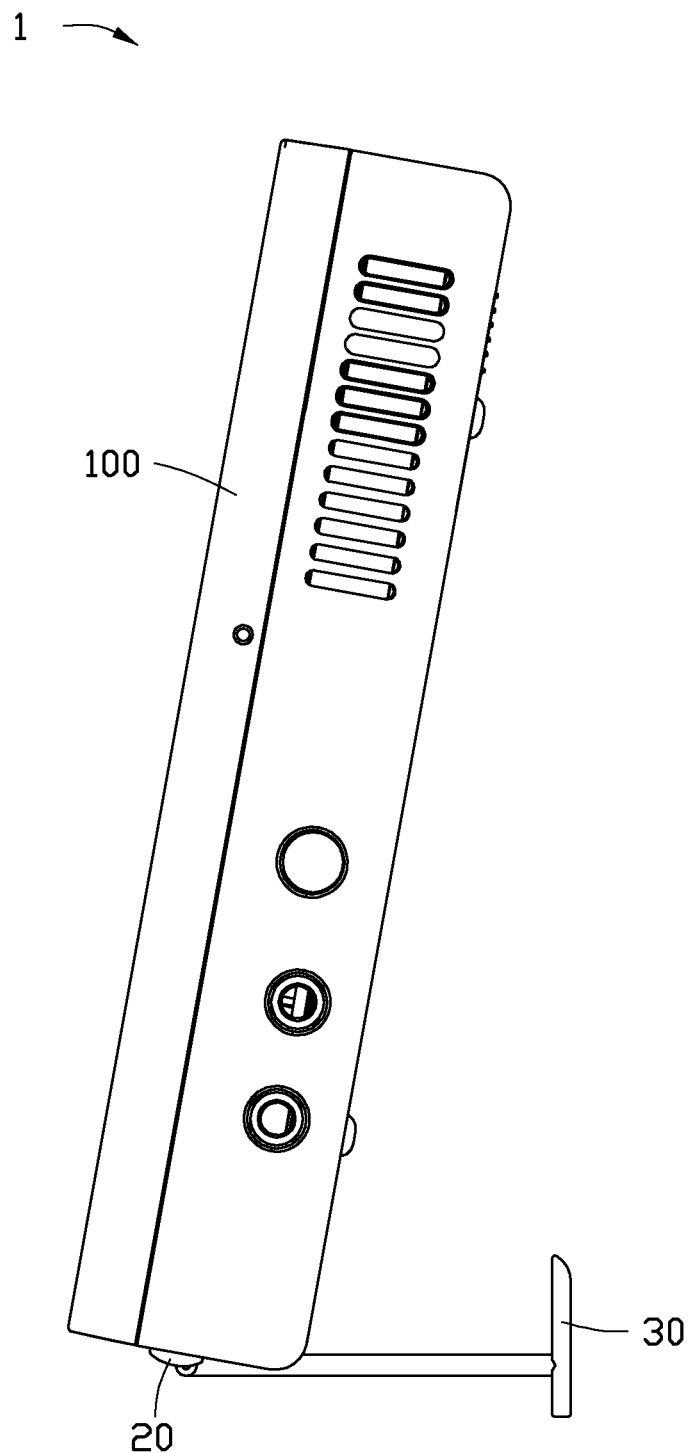
FIG. 7 is a right side plan view of the portable electronic device of FIG. 1, showing the portable electronic device in a substantially erect position with the support in a supporting position.
Figure 8:
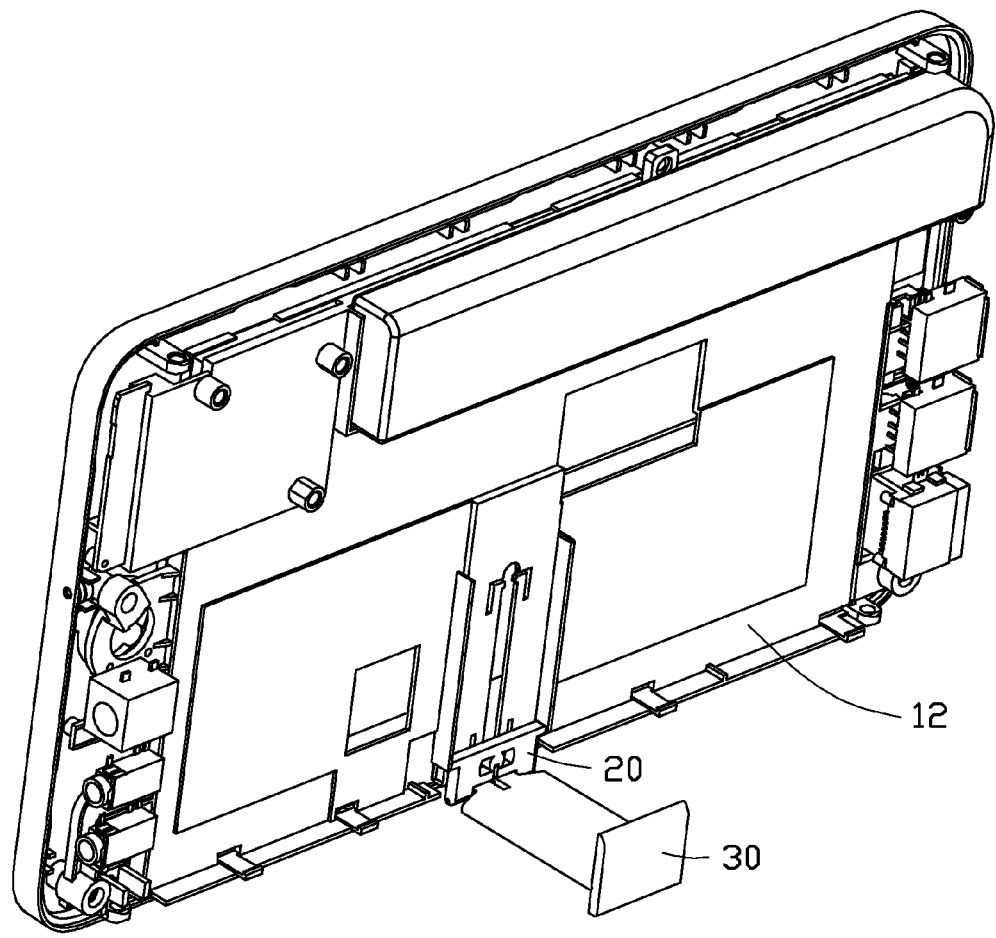
FIG. 8 is an isometric view of the portable electronic device of FIG. 1, showing the portable electronic device in the substantially erect position with the support in the supporting position, but omitting the back cover of the portable electronic device.

Then, the support 30 is rotated about the pivot 40 and the slider 20 until the support 30 can hold the portable electronic device 1 in a substantially erect position, as shown in FIGS. 7 and 8. That is, when the portable electronic device 1 is held substantially erect, the support 30 is in a supporting position. In the supporting position, the body 31 of the support 30 supports the back cover 11 of the portable electronic device 1, and thus the support mechanism 200 supports the portable electronic device 1. This brings much convenience to a user of the portable electronic device 1. Furthermore, the process described above can be reversed such that the support mechanism 200 can be retracted into the housing 10, as shown in FIG. 1.

Although the present disclosure has been specifically described on the basis of various embodiments thereof, the disclosure is not to be construed as being limited thereto. Various changes or modifications may be made to the embodiments without departing from the scope and spirit of the disclosure.

What is claimed is:

1. A portable electronic device comprising:
a housing defining a sliding groove therein, the sliding groove comprising two opposite fingers therein, each finger comprising a protruding block; and
a support mechanism movably connected to and receivable in the housing, and comprising:
a slider slidably received in the sliding groove, and comprising a base defining a recess and a connection member protruding from the base, the connection member comprising a connection portion received in the recess and having a size greater than a gap between the protruding blocks of the two opposite fingers; and
a support comprising a body and a board connected to one end of the body, an opposite end of the body being rotatably connected to the slider;
wherein the protruding blocks restrain movement of the connection portion when the body of the support is completely received in the housing, and when the slider is slid outward, the connection portion urges the protruding blocks and the two opposite fingers deflect away from each other, thereby enlarging the gap between the protruding blocks and allowing the connection portion to pass the protruding blocks and slide to a position in which the body is external to the housing and is rotatable relative to the slider to a position in which the support mechanism can support the housing on a supporting surface.

2. The portable electronic device as described in claim 1, wherein the protruding blocks are elastically biasable away from each other under urging of the connection portion.

3. The portable electronic device as described in claim 1, wherein the connection portion is a cylinder and has a width greater than the gap between the protruding blocks.

4. The portable electronic device as described in claim 1, wherein the sliding groove defines a stepped structure, and further comprises a larger groove portion and a smaller groove portion in communication with each other.

5. The portable electronic device as described in claim 4, wherein the connection member further comprises a head set atop the connection portion, and the head is received in the larger groove portion and slidably rests on a step formed between the larger groove portion and smaller groove portion.

6. The portable electronic device as described in claim 1, wherein the fingers are elastically deformable.

7. The portable electronic device as described in claim 1, wherein the board is vertically connected to the one end of the body.

8. The portable electronic device as described in claim 1, wherein the portable electronic device is selected from the group consisting of a tablet computer, an electronic reader, a mobile phone, and a music player.

9. A support mechanism, configured for supporting a portable electronic device, the portable electronic device defining a sliding groove therein, the sliding groove comprising at least two opposite spring fingers therein, each finger comprising a protruding block, the support mechanism comprising:
a slider configured to be slidably received in the sliding groove, and comprising a base defining a recess and a connection member protruding from the base, the connection member comprising a connection portion received in the recess and having a size greater than a gap between the protruding blocks of the two opposite fingers; and a support comprising a body and a board connected to one end of the body, an opposite end of the body being rotatably connected to the slider;

wherein the connection portion is configured to be restrained by the protruding blocks when the body of the support is completely received in the portable electronic device, and also configured to urge the protruding blocks and the cause the two opposite fingers to deflect away from each other when the slider is slid outward whereby the gap between the protruding blocks is enlarged and the connection portion is able to pass the protruding blocks and slide to a position in which the body is external to the portable electronic device and is rotatable relative to the slider to a position in which the support mechanism can support the portable electronic device on a supporting surface.

10. The support mechanism as described in claim 9, wherein the connection portion is a cylinder.

11. The support mechanism as described in claim 9, wherein the board is vertically connected to the one end of the body.

12. A portable electronic device, comprising:
a housing defining an opening therein;
an internal fixing element comprising a pair of protruding blocks and defining a sliding groove in communication with the opening, the sliding groove defining a stepped structure and comprising:
 a larger groove portion; and
 a smaller groove portion communicating with the larger groove portion;
  wherein the protruding blocks protrude toward each other into the smaller groove portion;
a support mechanism slidably receivable in the housing, and comprising:
 a slider defining a recess and comprising:
  a connection portion received in the recess, and abutting the pair of the protruding blocks when the slider is in a retracted position in the sliding groove; and
  a head set atop the connection portion, the head received in the larger groove portion, and slidably resting on a step formed between the larger groove portion and the smaller groove portion; and
 a support comprising a body and a board connected to one end of the body, an opposite end of the body being rotatably connected to the slider.

13. The portable electronic device as described in claim 12, wherein the fixing element is in the form of a board.

14. The portable electronic device as described in claim 12, wherein the connection portion is a cylinder and has a width greater than the gap between the protruding blocks.

15. The portable electronic device as described in claim 12, wherein the stepped structure has a substantially arch-shaped configuration.

16. The portable electronic device as described in claim 12, wherein the two protruding blocks are elastically biasable away from each other under urging of the connection portion.

17. The portable electronic device as described in claim 12, wherein the portable electronic device is selected from the group consisting of a tablet computer, an electronic reader, a mobile phone, and a music player.

* * * * *